Jan. 7, 1930.　　　T. H. LLOYD　　　1,742,477
VEHICLE BRAKE TESTER
Filed April 4, 1928　　　2 Sheets-Sheet 1

Inventor
Thomas H. Lloyd
By M. C. Frank
Attorney

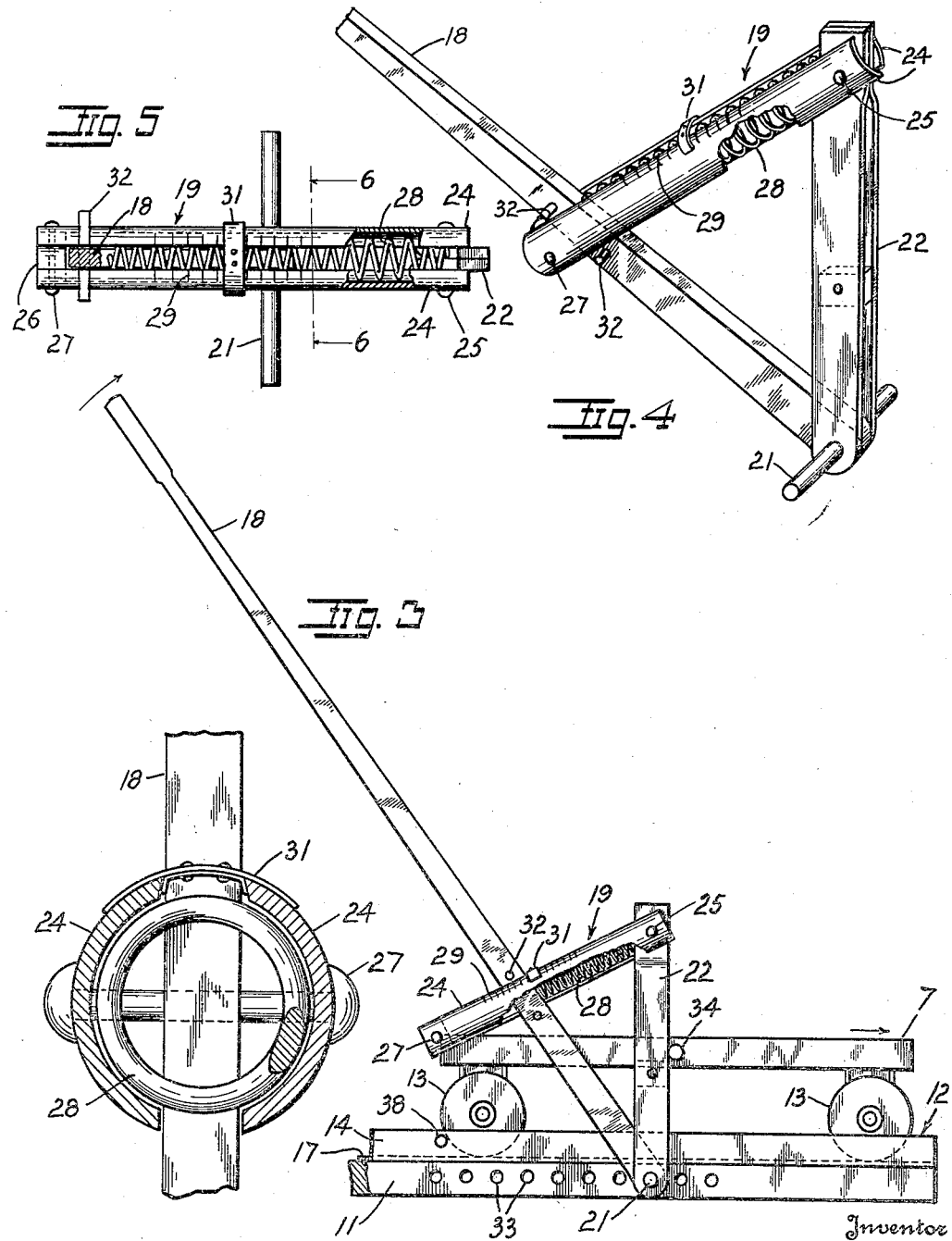

Patented Jan. 7, 1930

1,742,477

UNITED STATES PATENT OFFICE

THOMAS H. LLOYD, OF OAKLAND, CALIFORNIA

VEHICLE BRAKE TESTER

Application filed April 4, 1928. Serial No. 267,428.

The invention relates to a device for measuring and comparing the braking forces at the different wheels of a vehicle when the brakes are applied.

An object of the invention is to provide a device of the character described which approximates road test conditions with particular likeness and without involving a movement of the vehicle.

Another object of the invention is to provide a device of the character described having an extremely simple operative mechanism.

A further object of the invention is to provide a device which is so formed as to be truly portable and which is arranged for use under a substantially unlimited variety of conditions without involving any special provision for its installation.

A still further object of the invention is to provide a device of the character described by which readings may be taken in a minimum time.

The invention possesses other objects and features of advantage, some of which, with the foregoing, will be set forth in the following description of a preferred form of the invention which is illustrated in the drawings accompanying and forming part of the specification. It is to be understood, however, that no limitation to the showing made by the said drawings and description is to be inferred, as variations may be adopted within the scope of the invention as set forth in the claims.

Referring to said drawings:

Figure 1 is a side view of apparatus embodying the invention and operatively associated with a vehicle.

Figure 2 is an enlarged rear view of the apparatus taken at the line 2—2 in Figure 1.

Figure 3 is an enlarged side view of a portion of the apparatus as shown in Figure 1, parts of the structure being broken away.

Figure 4 is a perspective view of a dynamometer forming part of the apparatus.

Figure 5 is a plan view of the dynamometer.

Figure 6 is a sectional view taken on the line 6—6 in Figure 5.

As is well known, it is very necessary that the braking forces for a wheel vehicle be equally distributed between the wheels at the two sides thereof in order to avoid skidding, unequal tire wear, and other difficulties. The use of brakes on all four wheels of a vehicle has, if anything, increased the hazard of unbalanced brakes, so that adjustment for balanced braking power is increasingly necessary, and the present invention relates to a particularly simple and inexpensive testing apparatus for use in ascertaining and comparing the braking force of the brakes of a set both before and after adjusting.

Essentially, and as shown, the present apparatus comprises wheeled trucks 7 arranged to be disposed beneath the different wheels 8 of a motor vehicle 9 for supporting the vehicle. The different trucks are disposed with their lines of rolling parallel to the longitudinal axis of the vehicle, and means are provided for urging a displacement of each truck associated with a braked wheel having the brake thereof set whereby the wheel is turned against the resistance of its brake. Dynamometer means are associated with the truck displacing means whereby the displacing force may be measured. By taking readings on all the braked wheels of a vehicle having a common brake actuating means set to a fixed degree, the readings obtained by the apparatus give a comparison which may be directly used for adjusting the brakes.

Preferably, and as shown, the trucks 7 are arranged to be mounted in pairs on stringers 11 having tracks 12 extending longitudinally therealong and on which the trucks are arranged to be carried for a guided movement longitudinally of the stringers.

As herewith disclosed, the trucks 7 are each provided with four wheels 13 and the tracks 12 comprise pairs of angle iron members secured to the top of the stringers with flanges 14 thereof disposed to extend upwardly from the stringers in the planes of their inner and outer side edges 15 and 16 respectively. The other flanges 17 of the angle iron track members are arranged to lie along the tops of the stringers to provide a supporting surface for the wheels 13. The stringers and tracks are of such length that vehicles of different wheel base may be mounted thereon, it being noted that each stringer is arranged to provide a support for one side of the vehicle through the mounting on its track of the wheels of such side.

A lever 18 is preferably provided for effecting the beforementioned displacement of a truck from its initial setting beneath a wheel. The lever 18 is not arranged to act directly on a truck, but acts indirectly thereon through a suitable force-measuring means, or dynamometer 19. Extending transversely from one end of the lever 18 is a pivot shaft 21 having pivotally mounted thereon a member 22. Preferably, and as shown, the member 22 is in the form of a yoke having the opposed extremities at opposite sides of the lever whereby the lever and member are mutually restrained for relative movement in a common plane. Mounted at the upper end of the member 22 is a spring casing, here shown in the form of a split cylindrical shell having the sections 24 thereof separated to provide a guideway in the plane of the lever 18 and member 22. The casing is angularly related to the member 22 and the casing sections 24 are pivoted to the upper end of the member 22 at opposite sides thereof by means of a pivot pin 25. The free ends of the casing sections 24 are held in spaced relation by means of a spacing block 26 interposed between them, a rivet pin 27 being engaged through the sections and block 26 for holding them fixed together.

The lever 18, it will now be noted, extends through the guide way defined between the casing sections 24 and between the block 26 and member 22, and a helical compression spring 28 is disposed in the casing for engagement between the lever and the member 22. Preferably, and as shown, the casing is provided with a calibrated scale 29 whereby readings may be taken corresponding to the forces to be measured. To avoid the necessity of taking a reading of the scale 29 while the lever is in use, a marker 31 is preferably provided, such marker being frictionally engaged wth the casing and disposed in the path of movement of the lever 18, whereby it will be set at the furthest point which is reached by the lever when it is displaced toward the member 22. Pins 32 extend transversely from the lever at opposite sides of the casing whereby the lever will maintain a predetermined relation to the casing.

It will now be noted that a series of perforations 33 is provided in the outer edge of each stringer 11, such perforations being arranged to receive a free end of the pivot shaft 21 of the lever 18 in perpendicular relation to such stringer edge. A projection 34 is provided on each truck platform, said projection extending laterally from the platform into the plane occupied by the lever 18 and member 22 when the shaft 21 is engaged in a perforation 33 as described.

In using the lever structure described, the member 22 is disposed substantially vertically and against the forward side of a truck projection 34 with the shaft 21 engaged in an appropriate perforation 33. A rearward movement of the lever 18 to displace the truck 7 will be resisted by the action of the brake of the vehicle wheel on the truck and the amount of such resistance will be measured on the scale 29. As the effort exerted by means of the lever is increased, a sufficient force will finally be exerted to move the truck and thus turn the wheel slightly to relieve the actuating force, whereby the marker 31 will be moved no further and may be read when and as desired.

In this manner, the effort for displacing the braked wheels may be ascertained as a guide in comparing the static resistance of the brakes at the different wheels. Having such information, any required adjustments may be made, it being clear that but a single operative movement of the lever 18 need be made by an operator for each test whereby readings may be taken in a minimum of time.

Preferably, and as shown, the lever 18 is always applied in a manner to urge the trucks rearwardly; in this manner, the rotative displacement of the wheels is in the same direction as when the vehicle is moving forwardly. The vehicle itself is desirably held against a backward movement in some suitable manner, as by means of the chain 35 secured between it and a fixed member 36. It will be noted that if the force applied to the brake system, as by a foot lever (not shown), be known and have the value for which the brakes are designed, the readings obtained with the present device will have both quantitative and qualitative significance.

It will now be noted that the apparatus hereinbefore described is particularly intended for cooperative use with vehicle lifting devices (not shown) arranged to engage the vehicle axles for lifting the vehicle. With the vehicle raised by such a device, the stringers 11 would be placed beneath the vehicle wheels with the trucks 7 placed to receive the wheels, so that the disposal of the vehicle on the trucks is effected merely by lowering the vehicle. A device of the type referred to has not been actually shown, such not being a part of the present application, it being obvious, however, that the portability and movability of the stringers 11 is particularly necessary when the present apparatus is to be used with such a device.

In the event that a lifting device such as has been referred to is lacking, means are provided for mounting a vehicle on the trucks directly from a floor. As shown, a ramp 37 is provided for use with each stringer and its trucks, such ramp being disposable at the rear end of its stringer and terminating at the level of the top of the trucks. For mounting a vehicle on the apparatus, the two stringers are placed in parallel and properly spaced relation in front of the vehicle with the ramps ahead of the front vehicle wheels and both trucks 7 of each stringer disposed adjacent the rear end of the stringers, whereby the front vehicle wheels may traverse the ramp and rear trucks for disposal on the front trucks. The rear trucks, it will be noted, are arranged to be held against a forward movement by a suitable stop means—as shown, pins 38 extend inwardly from a track flange 14 into the path of a truck wheel 13 for this purpose. Means are provided for releasably holding the front trucks while the front vehicle wheels are being placed thereon, and, as shown, a track flange 14 is provided with a perforation 41 for the removable reception of a stop pin (not shown), said pin being disposable ahead of a wheel 13 of the forward truck. When the front vehicle wheels are properly disposed on the front trucks, the latter are released and so move forward as the rear vehicle wheels approach and move onto the rear trucks, the front wheels being in the meantime held in place on the front trucks by means of suitable chocks (not shown). The brakes are then set and the wheels tested as described. Removal of the vehicle is arranged to be effected by reversal of the steps now described, except that the stop pins for the front trucks need not be used during removal of a vehicle. It will of course be obvious that the movement of the front trucks in the manner indicated effects an automatic adjustment of the apparatus to vehicles having different wheel bases.

I claim:

1. In apparatus for measuring the anti-rotation resistance of vehicle wheel brakes, stringers providing tracks, trucks movable along said tracks and arranged to supportably receive the wheels of a vehicle, and means operative to urge a displacement of a truck beneath a vehicle wheel.

2. In apparatus of the character described, movable stringers providing tracks, trucks movable along said tracks and arranged to supportably receive the braked wheels of a vehicle, means operative to effect a displacement of a truck beneath a vehicle wheel having its brake set, and means operated by said last means for ascertaining the force necessary for effecting said truck displacement.

3. In apparatus of the character decribed, stringers providing tracks, trucks movable along said tracks and arranged to supportably receive the braked wheels of a vehicle, and a lever pivoted to a stringer and directly engaging and operable against a wheel-supporting truck thereof to urge a longitudinal displacement of the truck with respect to the vehicle.

4. In apparatus of the character described, trucks arranged to supportably receive the wheels of a vehicle having wheel brakes, tracks for said trucks, a different track being provided for the wheels at each side of the vehicle, independent and movable members supporting said tracks, a lever arranged for removable and pivotal connection to the different ones of said members and selectively operable against the individual trucks for urging a displacement thereof.

5. In apparatus of the character described, trucks arranged to supportably receive the wheels of a vehicle having wheel brakes, tracks for said trucks, stringers supporting said tracks, a lever pivotally connected to a stringer and operative against a truck carrying a braked wheel having its brake set to effect a displacement of said truck, and dynamometer means for measuring the truck displacing force.

6. In apparatus of the character described, tracks, trucks movable along said tracks and arranged to supportably receive the braked wheels of a vehicle, means providing fulcrum bearings in fixed relation to said tracks, and a lever carrying a fulcrum member for selective engagement in one of said fulcrum bearings and operative against a truck for urging a displacement thereof.

7. In apparatus of the character described, a track, a truck movable along said track and arranged to supportably receive a braked wheel of a vehicle, means providing fulcrum bearings in fixed relation to said track, a hand lever carrying a fulcrum member for engagement in a fulcrum bearing and operative against said truck for urging a displacement thereof, and a dynamometer carried by said lever and arranged to be operatively interposed between said lever and truck.

8. In apparatus of the character described, a truck arranged to supportably receive a braked wheel of a vehicle, a support providing track means for said truck, a lever pivoted to said support and operative against the truck to effect a displacement thereof while a bushed wheel is mounted thereon, and dynamometer means for measuring the truck displacing force exerted by said lever.

In testimony whereof, I affix my signature.

THOMAS H. LLOYD.